United States Patent [19]

Krieg et al.

[11] Patent Number: 4,623,815
[45] Date of Patent: Nov. 18, 1986

[54] HALOGEN INCANDESCENT-TYPE REFLECTOR LAMP, PARTICULARLY FOR DISPLAY ILLUMINATION

[75] Inventors: Rudolf Krieg, Munich; Friedrich Ziegler, Wolfratshausen; Franz-Josef Bierbauer, Wörthsee, all of Fed. Rep. of Germany

[73] Assignee: Patent-Treuhand-Gesellschaft für elektrische Glühlampen mbH, Munich, Fed. Rep. of Germany

[21] Appl. No.: 596,015

[22] Filed: Apr. 2, 1984

[30] Foreign Application Priority Data

Apr. 12, 1983 [DE] Fed. Rep. of Germany ... 8310715[U]

[51] Int. Cl.⁴ .............................................. H01K 1/34
[52] U.S. Cl. .................................... 313/113; 362/296; 362/310; 313/25
[58] Field of Search ................. 313/113, 114, 115, 25; 362/296, 310

[56] References Cited

U.S. PATENT DOCUMENTS 3,904,904  9/1975  Meinecke et al. ................... 313/113
4,264,840  4/1981  Kuhnert et al. ..................... 313/115
4,287,448  9/1981  Bradley .............................. 313/113
4,479,072  10/1984 Gaugel et al. ...................... 313/113
4,507,712  3/1985  Dolan et al. .

FOREIGN PATENT DOCUMENTS 121819  10/1984 European Pat. Off. ............ 313/113

Primary Examiner—David K. Moore
Assistant Examiner—K. Wieder
Attorney, Agent, or Firm—Frishauf, Holtz, Goodman & Woodward

[57] ABSTRACT

A reflector lamp (FIG. 2) to form a direct replacement for a sealed-beam glass reflector lamp (FIG. 1) uses a halogen incandescent lamp (14) fitted to terminal strips (16) of a ceramic base (12) located in the reflector. The reflector is made of thin-sheet aluminum - for example about 0.8 mm, the lamp being held in position by a weld connection of the lamp leads to contact strips riveted to the base, and retained against twisting by bent-over flanges (18).

11 Claims, 8 Drawing Figures

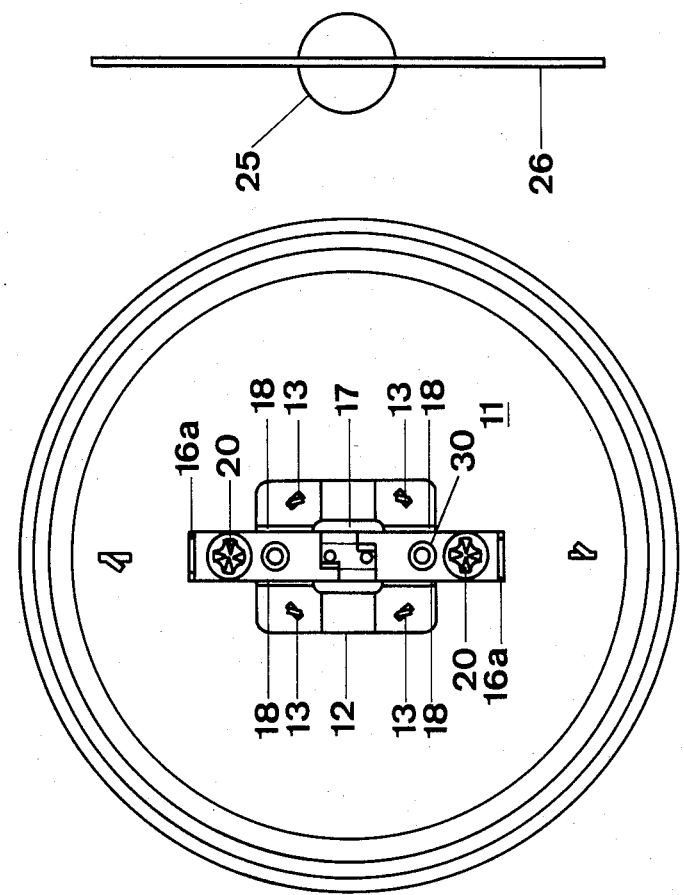
FIG. 6
FIG. 4
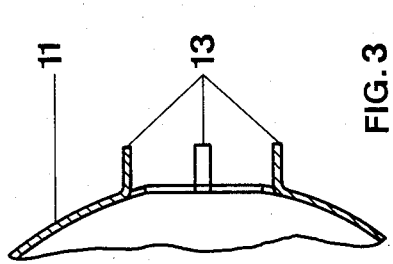
FIG. 3
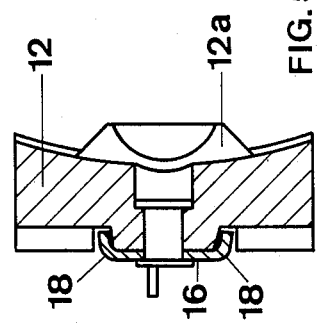
FIG. 5

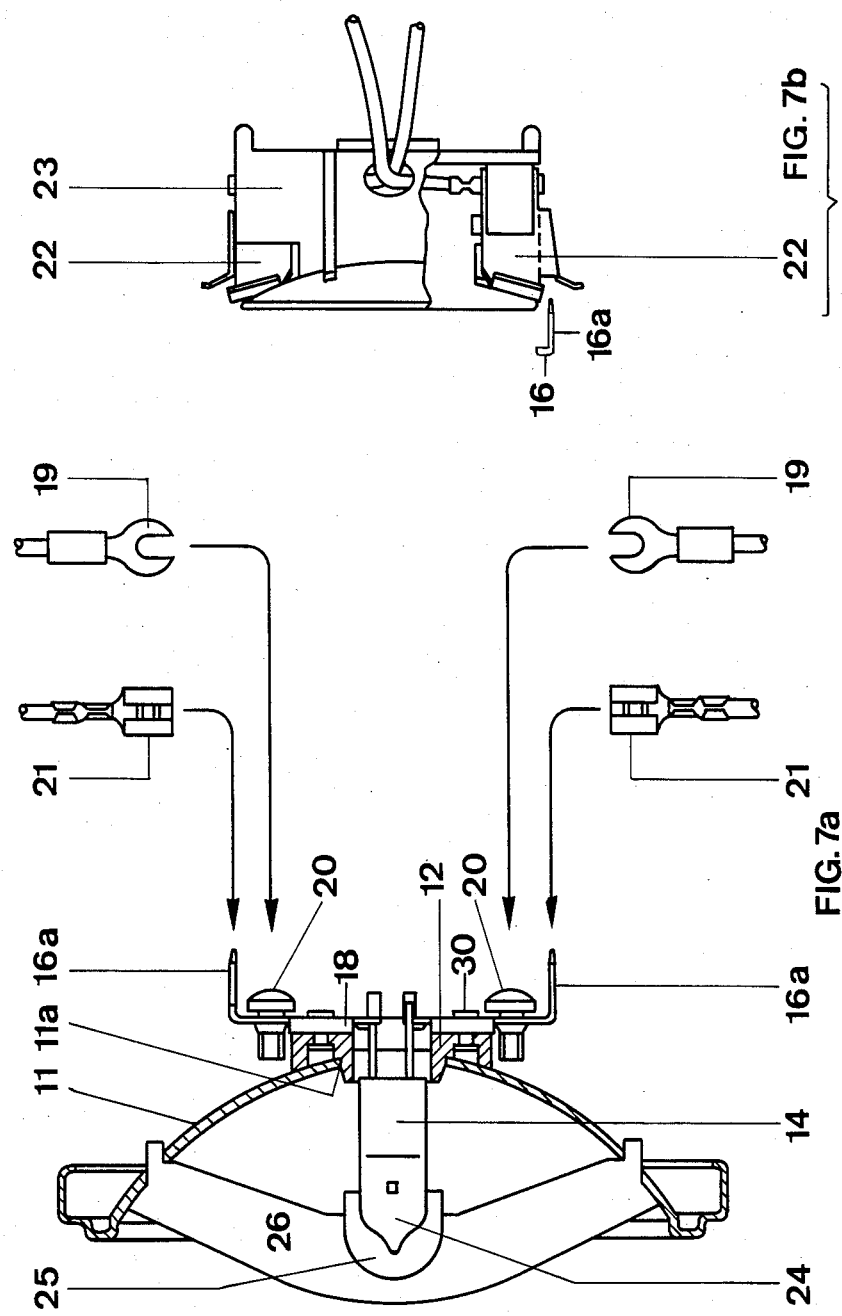

HALOGEN INCANDESCENT-TYPE REFLECTOR LAMP, PARTICULARLY FOR DISPLAY ILLUMINATION

The present invention relates to a lamp-reflector combination, utilizing a halogen incandescent lamp combined with a reflector, which is particularly adapted for illumination of display windows, special displays, passageways and the like.

BACKGROUND

Illumination of various areas, and particularly spot illumination, is frequently done by using an incandescent lamp which is located within a parabolic reflector. Electrical terminal elements are located on the back side of the reflector. Usually, lamps of this type are formed in sealed beam construction. A reflector body, made of pressed glass, is mirrored. A front plate is secured to the reflector body, seated or sealed thereto in vacuum-tight manner. The front plate or lens is formed with a stepped ring so that the lamp can be properly arranged in fixtures or other holders. The ring also seals the space within the reflector against ambient air. Usually, the reflector is filled with a gas, similar to a common lightbulb. An incandescent filament is located in the reflector space. The incandescent filament is carried by current leads which, further, may carry a small plate forming a shield to prevent undesired stray light emission. Metallic connection caps are melted from the reflector glass, through which the current leads are passed, first guided through openings in the reflector, and then soldered to suitable connection terminals. The connection caps carry the contacting elements, typically of sheet metal, for further electrical connection leads, and may additionally carry terminal screws for screw connection with cables or the like.

Lamps of this type are comparatively heavy, and the efficiency of light conversion of supplied energy is subject to improvement.

THE INVENTION

It is an object to provide a reflector lamp which has high output with a given power consumption, and is substantially lighter and easier to handle than pressed-glass, sealed-beam reflector-type lamps.

Briefly, the reflector-halogen incandescent lamp comprises a metal reflector, typically made of thin aluminum, formed with an outer edge thereof in form of a roll, turned-over portion, or cuff, having a shape approximately equivalent to the outer edge of the glass bead formed on the prior art lamps, so that the seating of the reflector in a fixture will be equivalent to that of a glass end portion, and thus make the lamp exactly interchangeable with sealed-beam spotlights. The halogen incandescent lamp itself is held in a high-temperature ceramic socket, passing through an opening in the reflector and secured therein. The socket itself has a central opening into which the lamp is fitted, the lamp terminals passing through the central opening. Connection terminal flags or the like are secured to the ceramic socket, for example by riveting, the connection terminals being strip-like and having connecting screws, for example to attach a cable, a cable terminal or the like and, additionally, bent-up portions to permit attachment of push-on terminals. The terminal strips are located on opposite lateral sides of the central opening in the ceramic, and extend over the opening of the ceramic to permit easy attachment, for example by spot-welding, of the connecting leads of the halogen incandescent lamp.

In accordance with a preferred feature of the invention, an anti-glare cap is placed over the halogen incandescent lamp, held in position by a bridge-like bow, formed as a strip of sheet metal set on edge, and spanning the opening of the reflector.

DRAWINGS

FIG. 3 is a fragmentary side view of the apex portion of the reflector;

FIG. 4 is a back view of the lamp;

FIG. 5 is a fragmentary sectional view through the ceramic socket used in this lamp;

FIG. 6 is a front view of the anti-glare and supporting strip;

FIG. 7a shows possibilities for connection of electrical terminals; and

FIG. 7b is a side view of a conventional socket for both the new and prior art lamps with electrical connecting wires attached thereto.

DETAILED DESCRIPTION

Figure 1:
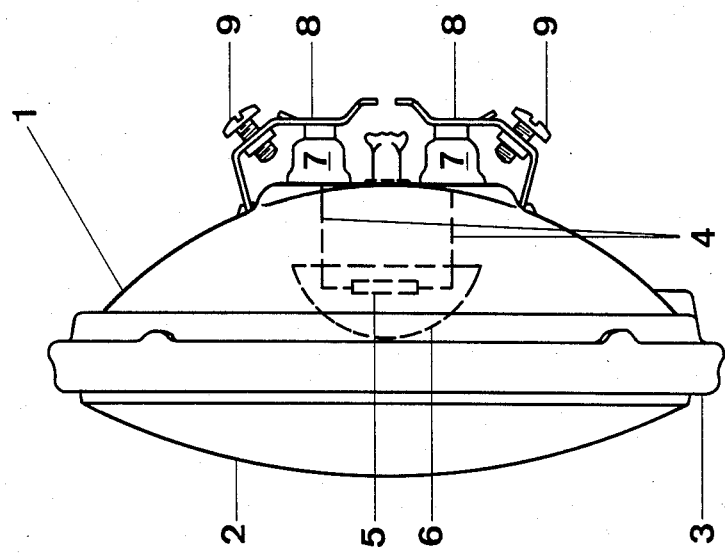
FIG. 1 is a side view of a prior art sealed-beam lamp used for spot illumination.

The prior art lamp of FIG. 1 is made in accordance with the "sealed-beam" technology; it has a heavy reflector body 1, made of pressed glass. The reflector space is vacuum-tight, and separated from ambient air by a front plate 2, likewise made of glass. The junction between the reflector and the front plate is formed as a ring 3, which is suitably shaped for proper placement of the lamp in fixtures, designed for its reception. In the vacuum-tight reflector space there is arranged a coiled filament schematically shown at 5, which is carried by electrical connection leads 4. An anti-glare cap 6 is placed in front of the filament to eliminate undesired stray lateral light beams.

The ends of the current leads 4 are conducted through openings in the reflector, and soldered into electrical connecting caps 7, usually made of brass or similar metal, which are fitted, air-tight, by melting-in into the glass body of the reflector 1. Contact terminal strips 8 are connected to the caps 7. The contact terminal strips 8 carry attachment screws 9, used to connect the lamps to electrical cables or the like. The contact strips 8 also permit association of the lamp with a special socket 23 (FIG. 7b) to be used therewith. Reflector lamps with associated sockets are commercial articles. If the socket is not needed, for example for specific installations, electrical connection can be made directly by the screws 9.

Figure 2:
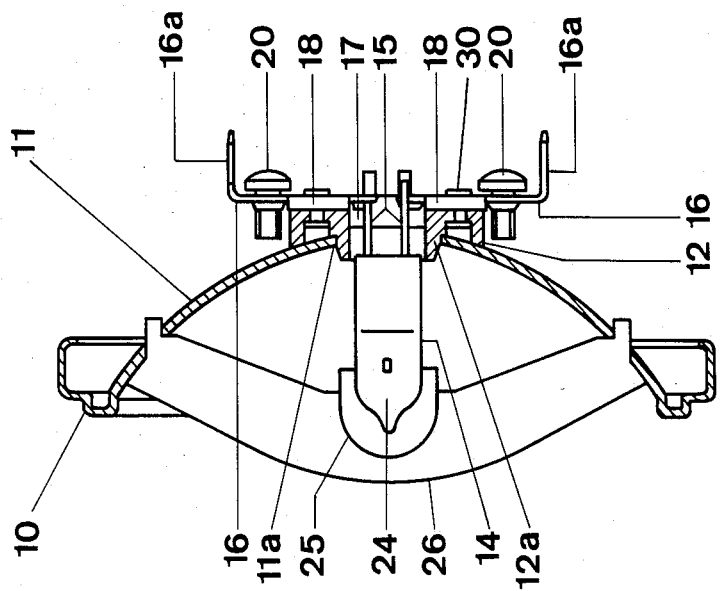
FIG. 2 is a vertical sectional side view of the lamp in accordance with the present invention, and drawn to the same scale as the prior art lamp of FIG. 1.

The lamp in accordance with the present invention—see FIGS. 2-7—has the same external dimensions as the lamp of the prior art shown in FIG. 1. Contrary to the lamp of FIG. 1, however, the reflector 11 is made of lightweight reflective metal, for example aluminum, preferably commercially pure aluminum, of between about 0.8 mm to 1 mm thickness. An aluminum reflector of, for example, about 0.8 mm thickness is preferred. The reflecting surface is smooth, of parabolic shape, and has a shiny anodized or elox surface. There is no front disk or lens. The function of the ring 3 of the prior art lamp of FIG. 1 is also available in the lamp of the invention as shown in FIG. 2, by forming a cuffed offset-edge outer rim 10 on the reflector 11. The outer shape of the rim or cuff 10, seen in cross section in FIG. 2, matches that of the shape of the ring 3 of the prior art lamp. The depth of the reflector 11, from a diametrical theoretical line across the opening of the reflector to the apex thereof, is, at the most, about 3 cm. A circular opening 11a is formed in the apex of the reflector 11. A socket element 12—see FIGS. 2 and 4—is inserted from the back side into the reflector. The base 12 is made of a high-temperature resistant material, for example a ceramic. The base 12 has a raised center portion 12a, passing through the opening 11a. The raised center portion 12a is, in general, tubular, and is formed with a shoulder which seats against the back side of the reflector. The shoulder is shaped to match the bend or parabolic shape of the reflector. It is formed with recesses to receive attachment rivets 30, as will be explained below. The base 12 is essentially rectangular, or even square, in rear view—see FIG. 14—and is formed with four additional through-openings to receive four projecting strips 13—see FIG. 3—formed on the reflector 11. The strips 13 pass through the through-openings of the socket. The strips 13 are slightly longer than the depth of the socket and, at the end portions thereof, are twisted to thereby hold the socket in position, see FIG. 4.

The light source is a halogen incandescent lamp 14, for example of 6 V, 35 W. Such a lamp provides high axial light output, higher than that of known reflector lamps of similar power consumption. It is located in the apex of the reflector 11 and replaces the incandescent filament 5 of the prior art lamp of FIG. 1. The halogen incandescent lamp 14 has projecting terminal leads 15 which engage contact strips 16. The contact strips 16 extend over a central, approximately rectangular opening 17 within the base 12. The current leads 15 of the lamp 14 are welded to the strips 16, thereby holding lamp 14 securely in position and providing, at the same time, electrical and mechanical attachment of the lamp 14 in the reflector.

The contact strips 16 are riveted in the socket element 12. They are formed with lateral bent-over flange portions 18 (see FIG. 5) which fit into suitably formed notches in the base 12, immediately adjacent the location of the strips 16. The bent-over flanges 18 prevent twisting deformation of the strips 16 and, together with the weld connections to the leads 15, and the rivet connections 30 to the base provide for secure, stress-accepting and twist-resisting connection.

The contact or terminal strips 16 can be connected in various ways to electrical current supply cables. For example, cable terminals 19—see FIG. 7a—can be connected to the screws 20. Additional electrical connections, for example to another circuit, can be made by push-on terminals 21 extending over the end strips 16a of the terminal elements 16, to thereby provide standardized flat-strip push-on connecting ends. The push-on terminals are particularly suitable if the lamp is to be combined with one of the known socket fixtures 23—see FIG. 7b. As seen in FIG. 7b, the socket fixture 23 is pushed over the base 12. The contact strips 16 engage the terminal elements 22 formed in the socket 23.

Direct radiation from the light source 14 is prevented, and such direct radiation is shielded by a lamp cap 25, surrounding the end portion or dome 24 of the halogen incandescent lamp 14. Cap 25 re-directs and reflects direct light from the filament of the halogen incandescent lamp. Cap 25 is held in position by a flat strip of metal 26, secured to the reflector 11, for example by passing through a small slit-like opening therethrough and having its ends bent over or twisted as shown in FIG. 4. The strip is placed on edge so that its shadow effect is a minimum. It extends in bent-up bridging form diametrically across the reflector—as best seen in FIGS. 2 and 6, considered together.

Various changes and modifications may be made, and any features described herein may be used with any of the others within the scope of the inventive concept.

We claim:

1. A light-weight, front-disk-less halogen incandescent reflector-lamp combination interchangeable replacement for sealed beam spotlights, comprising
 a thin, parabolic reflector (11) of metallic sheet material and having a rim portion projecting forwardly from the apex of the reflector;
 a halogen incandescent lamp (14) located at the apex of the reflector; and
 electrical connection means (16) located at the back side of the reflector,
wherein, in accordance with the invention, the combination comprises
 a longitudinally stepped edge (10) formed on an outer edge of said rim portion of, and of the same sheet material as, the reflector (11), said outer edge being bent radially outward, and thence backwardly toward said reflector apex, thereby defining a hollow annular bead;
 a high-temperature-ceramic base (12), the reflector being formed with a central opening (11a), in which said base (12) is fitted, extending through the opening (11a) of the reflector;
 the ceramic base (12) being formed with a central opening (17);
 the connection means (16) comprise a pair of terminal strips (16) located at opposite lateral edges of the base (12) and extending over the central opening (17) in the base, and further include angled-off end portions (16a) shaped to receive push-on connectors (21, 22); and
 wherein the halogen incandescent lamp (14) is located in the axis of the reflector (11) and has current leads (15) extending therefrom, passing through the central opening of the base (12) and being electrically and mechanically secured to the portions of the terminal strips (16) extending over said central opening.

2. Combination according to claim 1, further including an anti-glare cap (25) extending over an end dome (24) of the lamp (14);
 and a flat strip (26) diametrically spanning the reflector at its outer, open end, and securing said anti-glare cap (25) in position.

3. Combination according to claim 1, wherein the base (12) has a raised center portion (12a) passing through the opening (11a) of the reflector, the central opening (17) in the base being formed in and passing through said raised central portion.

4. Combination according to claim 1, further including screw terminal connection elements (20) on the contact strips (16).

5. Combination according to claim 1, wherein said contact strips (16) are formed with lateral bent-over flanges (18); and said flanges are fitted against matching surface openings formed in the base (12) to prevent twisting deformation of the terminal strips.

6. Combination according to claim 1, wherein the base (12) is formed with engagement surfaces at the side remote from the reflecting side of the reflector, the engagement surfaces being shaped to match the outer shape of the reflector.

7. Combination according to claim 1, further including rearwardly projecting strips (13) formed on the reflector, said strips fitting through matching openings formed in the base (12) and being deformed to retain the base in position against the reflector.

8. Combination according to claim 1, wherein the reflector (11) comprises sheet aluminum having a thickness in the order of about 0.8 mm-1 mm.

9. Combination according to claim 1, wherein the reflector (11) comprises highly reflectively faced aluminum having a thickness of about 0.8 mm.

10. Combination according to claim 1, wherein the depth of the reflector from a diametrical line across the opening thereof to the apex thereof is up to about 3 cm.

11. Combination according to claim 1, wherein the halogen incandescent lamp is formed with connecting leads (15) extending in a direction parallel to the axis of the reflector, said leads (15) being welded to the terminal strips (16) to thereby electrically and mechanically connect the lamp in the base.

* * * * *